United States Patent

Jager

[11] 3,947,477
[45] Mar. 30, 1976

[54] PROCESS FOR THE PREPARATION OF AMINOHYDROXYANTHRAQUINONES

[75] Inventor: Horst Jager, Leverkusen, Germany

[73] Assignee: Bayer Aktiengesellschaft, Leverkusen, Germany

[22] Filed: June 21, 1974

[21] Appl. No.: 481,876

[30] Foreign Application Priority Data
June 22, 1973 Germany............................ 2331791

[52] U.S. Cl. .................................................. 260/380
[51] Int. Cl.² ........................ C07C 97/26; C09B 1/50
[58] Field of Search ..................................... 260/380

[56] References Cited
UNITED STATES PATENTS

| | | | |
|---|---|---|---|
| 1,659,360 | 2/1928 | Gubelmann et al. ............... | 260/380 |
| 1,922,480 | 8/1933 | Koehler ............................ | 260/380 X |

OTHER PUBLICATIONS
Lubs, *The Chemistry of Synthetic Dyes and Pigments*, Hafner Publishing Co., N.Y. (1955), pp. 338 to 342.

Primary Examiner—Paul F. Shaver
Attorney, Agent, or Firm—Plumley & Tyner

[57] ABSTRACT
Preparations of compounds of the formula

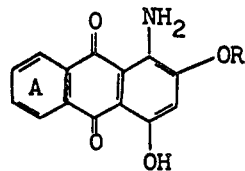

wherein R denotes a hydrocarbon residue and A can be substituted further by conversion of o-phthalic acids of the formula

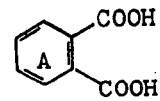

or their anhydrides with amines of the formula

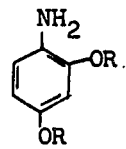

in boric acid/sulphuric acid.

2 Claims, No Drawings

PROCESS FOR THE PREPARATION OF AMINOHYDROXYANTHRAQUINONES

The subject of the invention is a process for the preparation of compounds of the formula

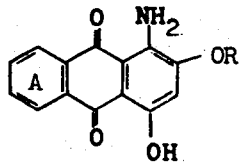  (I)

wherein
R denotes hydrogen or an alkyl or cycloalkyl group and
the ring A and the alkyl and cycloalkyl groups can contain further substituents.

As the radical R, $C_1$–$C_4$-alkyl groups such as $CH_3$—, $C_2H_5$—, iso—$C_3H_7$—, n—$C_3H_7$— and n—$C_4H_9$, and the cyclohexyl group, should be mentioned above all.

Substituents of the ring A can be, for example, halogen atoms, such as fluorine, chlorine and bromine, sulpho groups, carboxyl groups, alkoxy groups, such as methoxy and ethoxy groups, acylamino groups, alkyl groups, such as methyl and ethyl groups, and nitro groups. Suitable acylamino groups are in particular $C_1$–$C_4$-alkylcarbonylamino groups.

The process is characterised in that a o-phthalic acid of the formula

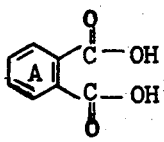  (II)

or its anhydride wherein
A has the indicated meaning is reacted with an amine of the formula

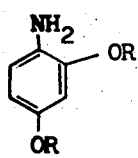  (III)

wherein
R has the indicated meaning in concentrated sulphuric acid, at elevated temperature, especially at temperatures of about 100° – 180°C, in the presence of boric acid, or the corresponding amides of the formula

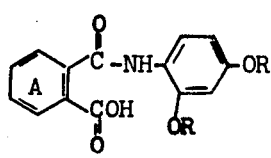  (IV)

or the corresponding imides of the formula

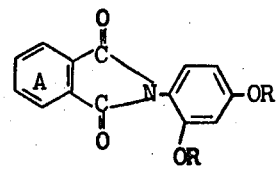  (V)

wherein
A and R have the indicated meaning are treated with boric acid in concentrated sulphuric acid at temperatures of about 100° – 180°C.

The compounds (IV) and (V) are known. They are obtained in a manner which is in itself known by reaction of an optionally substituted phthalic anhydride with (III).

Examples of suitable o-phthalic acids of the formula (II) are: o-phthalic acid, 3,6-dichlorophthalic acid, 3,4,5,6-tetrachlorophthalic acid, 3-nitrophthalic acid, 4-nitrophthalic acid, 4-methoxyphthalic acid, 4-methylphthalic acid, 4-carboxyphthalic acid, 4-sulphophthalic acid and the corresponding anhydrides.

The following should be mentioned from amongst the series of the amines of the formula (III): 1-amino-2,4-dimethoxy-benzene, 1-amino-2,4-diethoxy-benzene, 1-amino-2,4-dipropoxy-benzene, 1-amino-2,4-dibutoxy-benzene, 1-amino-2-methoxy-4-hydroxy-benzene, 1-amino-2-ethoxy-4-hydroxybenzene, 1-amino-2-methoxy-4-phenoxy-benzene, 1-amino-2-cyclohexoxy-4-hydroxy-benzene and 1-amino-2,4-dihydroxybenzene.

It proves to be advantageous, in the reaction of (II) with (III), to employ an excess of (II), for example up to 3 mols of (II), relative to (III). If (IV) and (V) are used, it proves desirable to add some (II), for example up to 2 mols of (II).

The sulphuric acid used is of about 80–105% strength. In general, sulphuric acid monohydrate is used. A greater excess of free $SO_3$ is to be avoided. The amount of sulphuric acid is generally between 3 and 20 times that of the (III), (IV) or (V) employed.

The boric acid is employed in at least equimolar amounts relative to (III) or (IV) and (II).

The optimum reaction temperature is between 120° and 160°. The reaction time is 5–40 hours, depending on the reaction temperature, the concentration and the amount of the sulphuric acid.

For working up, the reaction solution is poured out into water, the mixture is briefly boiled up to destroy the boric acid ester and the product is then filtered off. The working up can be combined with purification by lowering the sulphuric acid concentration to 30–70% by adding water, filtering the mixture, briefly boiling up the residue, filtering off and washing until neutral.

If starting compounds (I) in which R represents alkyl or cycloalkyl are used, mixtures of compounds (I) with $R = H$ and $R =$ alkyl or cycloalkyl are in general obtained. If the reaction time and the reaction temperature are increased, the ratio of alkylated to non-alkylated compound shifts in favor of the non-alkylated compound. The mixture of alkylated and non-alkylated compound can be separated in a manner which is in itself known on the basis of the differences in solubility in alkalis.

The compounds (I) are known. They are dyestuffs and valuable intermediate products for the preparation of dyestuffs.

EXAMPLE 1

15.4 g of 1-amino-2,4-dimethoxy-benzene are introduced into 80 ml of sulphuric acid monohydrate at room temperature. 30 G of phthalic anhydride are then added and the mixture is stirred for one hour at 20°–30°. After addition of 10 g of boric acid, the mixture is warmed to 140° for 21 hours. The dark red melt is poured out into 1 l of water, the mixture is boiled up for 15 minutes and the product is filtered off at 80° and washed until neutral. After drying, 22.5 g of crude product are obtained. 15 G of a mixture of purpurinamide and 1-amino-2-methoxy-4-hydroxy-anthraquinone can be obtained therefrom by extraction with an organic solvent such as tetrahydrofurane, ethanol or ethyl acetate. The identity of the product is proved by a comparison with authentic samples, by means of thin layer chromatography.

EXAMPLE 2

15.4 G of 1-amino-2,4-dimethoxy-benzene are introduced into 150 ml of sulphuric acid monohydrate at room temperature. 30 g of phthalic anhydride are then added, the mixture is stirred for two hours at room temperature, 15 g of boric acid are then added and the whole is warmed to 140° for 30 hours. After working up as in Example 1, 17.0 g of crude product are obtained, from which 12.8 g of a mixture of purpurinamide and 1-amino-2-methoxy-4-hydroxy-anthraquinone can be extracted.

EXAMPLE 3

28.5 G of N,N-phthaloyl-2,4-dimethoxy-aniline, 15 g of boric acid and 20 g of phthalic anhydride in 70 ml of sulphuric acid monohydrate are warmed to 140° for 22 hours. After working up as in Example 1, 21.8 g of crude product are obtained, from which 14 g of a mixture of purpurinamide and 1-amino-2-methoxy-4-hydroxy-anthraquinone can be extracted.

EXAMPLE 4

28.5 G of N,N-phthaloyl-2,4-dimethoxy-aniline and 15 g of boric acid in 80 ml of monohydrate are warmed to 140° for 26 hours. After working up as in Example 1, 16.5 g of crude product and 12 g of the mixture described in Example 1 are obtained.

I claim:
1. Process for the preparation of a compound of the formula

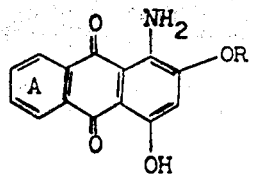

which comprises heating to a temperature of 100°–180°C in concentrated sulfuric acid in the presence of boric acid 1. a mixture of an o-phthalic acid of the formula

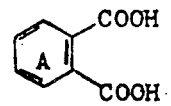

or its anhydride and an amine of the formula

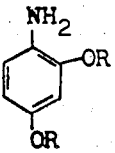

or 2. an amide of the formula

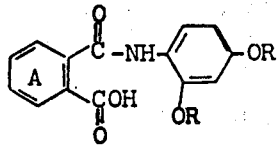

or 3. an imide of the formula

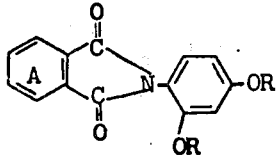

wherein
R is hydrogen, $C_1$–$C_4$-alkyl, or cyclohexyl; and
A is unsubstituted or substituted by fluoro, chloro, bromo, sulpho, carboxy, methoxy, ethoxy, methyl, ethyl, nitro, or $C_1$–$C_4$-alkylcarbonylamino.

2. Process of claim 1 wherein the temperature is 120°–160°C and the sulfuric acid has a strength of 80–105%.